United States Patent
Bolan et al.

(10) Patent No.: US 7,457,976 B2
(45) Date of Patent: Nov. 25, 2008

(54) POWER MANAGEMENT USING SPARE CAPACITY OF REDUNDANT POWER SUPPLY IN BLADE ENVIRONMENT

(75) Inventors: Joesph E. Bolan, Cary, NC (US); Thomas Brey, Cary, NC (US); Dhruv M. Desai, Cary, NC (US); Nickolas J. Gruendler, Raleigh, NC (US); James E. Hughes, Apex, NC (US); Edward J. Klodnicki, Durham, NC (US); Sumeet Kochar, Apex, NC (US); Gary R. Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 11/285,325

(22) Filed: Nov. 22, 2005

(65) Prior Publication Data

US 2007/0118771 A1 May 24, 2007

(51) Int. Cl.
*G06F 1/00* (2006.01)
*G06F 1/30* (2006.01)
(52) U.S. Cl. .................. 713/340; 713/300; 713/320
(58) Field of Classification Search .......... 713/300, 713/320, 340
See application file for complete search history.

(56) References Cited

U.S. PATENT DOCUMENTS

| | | | |
|---|---|---|---|
| 6,661,671 B1 | 12/2003 | Franke et al. | 361/752 |
| 7,043,647 B2 * | 5/2006 | Hansen et al. | 713/320 |
| 2003/0105984 A1 | 6/2003 | Masuyama et al. | 713/330 |
| 2003/0112582 A1 | 6/2003 | Sanders et al. | 361/600 |
| 2003/0120772 A1 | 6/2003 | Husain et al. | 709/224 |
| 2003/0125886 A1 | 7/2003 | Spitaels et al. | 702/62 |
| 2003/0188222 A1 | 10/2003 | Abbondanzio et al. | 714/12 |
| 2004/0024831 A1 | 2/2004 | Yang et al. | 709/208 |
| 2004/0030939 A1 | 2/2004 | Barr et al. | 713/300 |
| 2006/0230299 A1 * | 10/2006 | Zaretsky et al. | 713/320 |

* cited by examiner

Primary Examiner—Thomas Lee
Assistant Examiner—Jaweed A Abbaszadeh
(74) Attorney, Agent, or Firm—H. Artoush Ohanian; Cynthia S. Byrd; Biggers & Ohanian, LLP (57) ABSTRACT

A method and system are disclosed to enable and control over-subscription in a blade/chassis system and to provide the capability to recover in the event of the loss of a redundant power supply. An over-subscription policy is determined by a system administrator and is set in the chassis management module. Information regarding the maximum power allocation needed for each blade being powered by the power supply system is identified by the blade and stored in its VPD or otherwise made available to the chassis management module. The management module of the chassis in which the blades and power supplies are located uses this information to manage the subscription of blades and the over-subscription of blades when appropriate. If throttling is required, the system also allows a predetermined blade priority to be used to identify which blades will be reduced in power.

8 Claims, 7 Drawing Sheets

POWER MANAGEMENT USING SPARE CAPACITY OF REDUNDANT POWER SUPPLY IN BLADE ENVIRONMENT

BACKGROUND OF THE INVENTION

1. Field of the Invention

This invention relates to management of power in blade computing systems.

2. Description of the Related Art

In the past, information handling systems, e.g., workstations, servers, etc. were essentially self-contained systems within an appropriate housing. For example, a desktop PC would consist of user interface elements (keyboard, mouse, and display) and a tower or desktop housing containing the CPU, power supply, communications components and the like. However, as demands on server systems and PC systems increased and with the increasing spread of networks and the services available through networks, alternate technologies have been proposed and implemented.

Blade computing is one such technology. A blade server provides functionality comparable to or beyond that previously available in a "free standing" or self-contained server, by housing a plurality of information handling systems in a compact space and a common housing. Each server system is configured to be present in a compact package known as a blade, which can be inserted in a chassis along with a number of other blades. At least some services for the blades, typically including power supply, are consolidated so that the services can be shared among the blades housed in common. As blade technology has advanced, blade architecture has been developed whereby servers are packaged as single boards and designed to be housed in chassis that provide access to all shared services. In other words, blade servers today are single board units that slide into a slot in a housing in which other like boards are also housed.

Similar to blade servers, desktop blades involve the configuration of the major components of a PC onto a single card, and then storing/housing many such cards in a single chassis or housing. As with server blades, the use of desktop blades allows centralized management and maintenance of power shared among the various blades.

In an IBM BladeCenter® and other blade/chassis systems, there are advantages to allowing the maximum possible density of blades within the chassis. Other than the size of the chassis itself, the only limitation on blade density is the amount of power consumed by the blades in the chassis. In a typical blade center system there are two power domains, each supported by two power supplies running in a shared, fully redundant mode. This two-supply system is considered fully redundant because if one of the supplies (the "non-redundant" or primary supply) fails, the other supply (the "redundant" or secondary supply) is of a size that allows it to provide sufficient power to fulfill the power demands of the entire domain. In other words, the "nominal power" of a single supply is sufficient to provide power for the entire domain. In practice, the power allocation is typically shared between the multiple supplies when all are functioning properly. When one of the power supplies fails, the portion of the power that it was providing is automatically shifted to the remaining supply.

As CPUs and other devices have increased their speed, their power demands have also increased. The aggregation of blades constructed with newer, more powerful and power-demanding CPUs may exceed the capacity of power provided by a single (non-redundant) power supply system, i.e., they may exceed the nominal power that can be provided by a single power supply; meanwhile the nominal power available by existing power supplies has not increased in a corresponding manner. While larger capacity power supplies could be utilized, space limitations within the chassis can be prohibitive. Thus, there is either a limit to the number of blades that can be used, or other power management strategies must be applied.

One solution has been to "oversubscribe" the number of blades available within the chassis, and utilize some of the spare capacity of the shared redundant power supplies for normal operations. Oversubscribing is the term used to describe the situation where aggregate power demand is greater than the non-redundant supply capacity (e.g., at nominal value of the power supply in a "1+1" redundant system, i.e., a system having one supply that can handle the complete load, plus one additional supply also capable of handling the complete load). In an oversubscription situation, the power needed to supply the subscribed blades will exceed the capacity of the non-redundant power supply and thus the power system is no longer fully redundant. This can threaten the overall operation of the system, since if a power supply failure occurs, the remaining supply may be overloaded and thus an entire domain of blades may not be able to remain operational.

Besides implementing a fully redundant policy, multiple levels of oversubscription can be defined. Recoverable-oversubscription is where the limit of power with redundant power supplies (recoverable-oversubscription limit) is greater than the power supply nominal value, but where recoverable action (e.g., throttling of blades) can be taken when a redundant supply is lost, such that the remaining power supply will not shut down. Non-recoverable-oversubscription is where the limit of power with redundant power supplies (non-recoverable-oversubscription limit) is greater than the power supply nominal value, but where sufficient recoverable action (e.g., throttling of blades) cannot be taken in a manner that will assure that the remaining power supply will not shut down.

Accordingly, it would be desirable to have a blade power management system whereby excess power from redundant power supplies can be utilized in a manner that will not threaten the overall operation of the blade system.

SUMMARY OF THE INVENTION

The present invention provides a method, system, and computer program product for enable and control over-subscription in a blade/chassis system and to provide the capability to recover in the event of the loss of a redundant power supply. The power subscription capacity of a power supply is stored in the VPD of the power supply (or can otherwise be retrieved or calculated by the management entity). Further, information regarding the maximum power value (the maximum power allocation needed to power a particular blade) for each blade being powered by the power supply system is identified and stored in the blade. The management module of the chassis in which the blades and power supplies are located uses this information to manage the subscription of blades and the over-subscription of blades when appropriate. If throttling is required, the system also allows a predetermined blade priority to be used to identify which blades will be reduced in power (and the amount of reduction) or completely cut off from power during the throttle-back.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
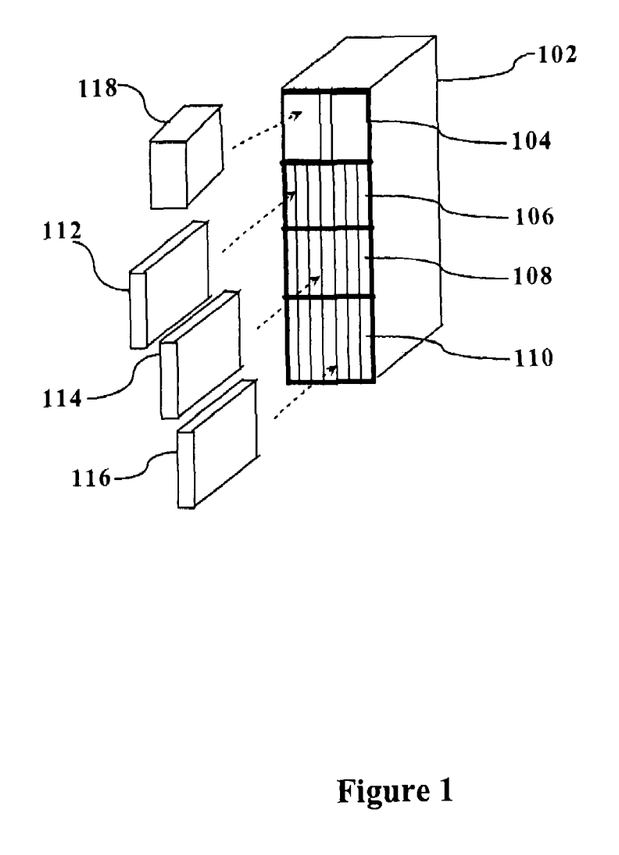
FIG. 1 illustrates an exemplary blade environment.

Referring now more particularly to the drawings, FIG. 1 illustrates an exemplary blade rack housing 102. While the view is simplified and certain elements to be described herein are not visible in FIG. 1, the rack housing 102 includes a plurality of chassis 104, 106, 108, and 110. Within the chassis, multiple blades, e.g., blades 112, 114, and 116, can be mounted. For example, in FIG. 1, blade 112 is illustrated as being mounted in chassis 106; blade 114 is shown as being mounted in chassis 108, and blade 116 is shown being mounted in chassis 110. A power supply 118 is shown being mounted in chassis 104.

Figure 2:
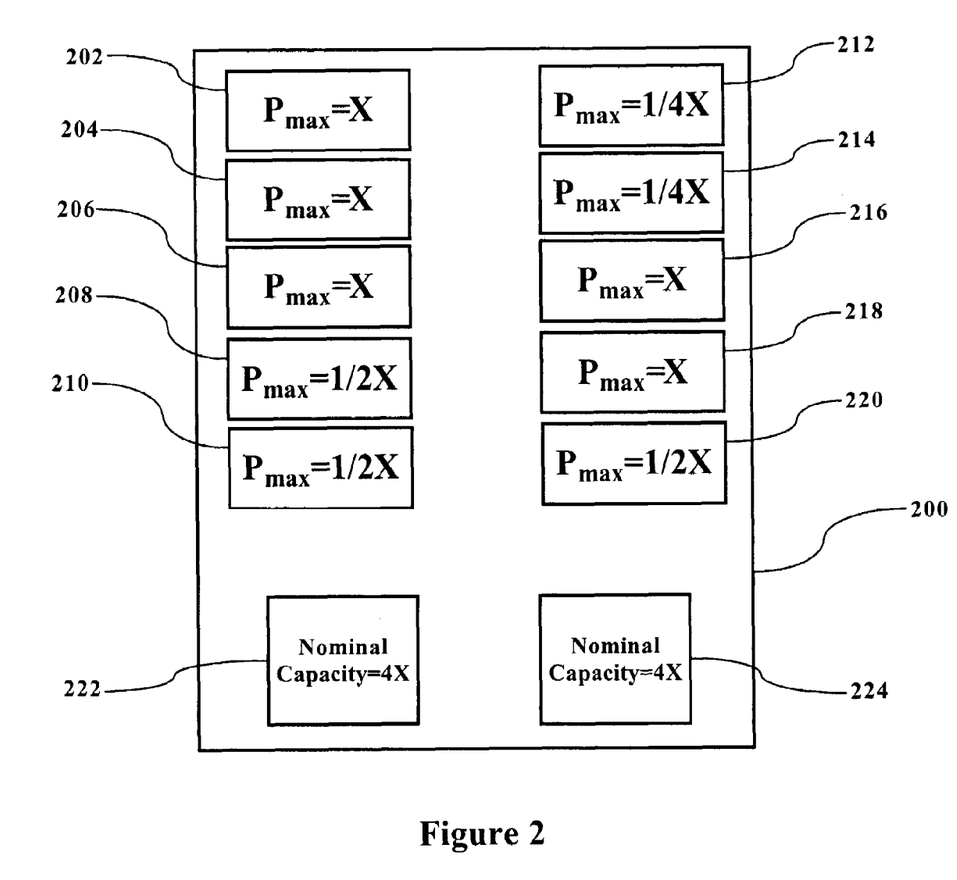
FIGS. 2-5 are block diagrams that provide an understanding of the allocation of power in a 1+1 redundant system in accordance with the present invention.

FIGS. 2-5 are block diagrams that illustrate the allocation of power in a 1+1 redundant system as used in the present invention. Referring to FIG. 2, a simplified example of a rack 200 containing blades 202-220 is shown. Power supplies 222 and 224 provide power to the blades in rack 200 on a shared-allocation basis. In this example, one unit of power=X watts, and each power supply 222 and 224 can supply a nominal power of 4X watts.

In the example of FIGS. 2-5, blades 202, 204, 206, 216, and 218 each are allocated 1X watts of power (maximum); blades 208, 210, and 220 are each allocated ½X watts of power (maximum); and blades 212 and 214 are each allocated ¼X watts of power (maximum). The maximum values are calculated based on the various options that may be installed on each blade. At any given time any of the blades may be drawing the maximum values; however, it is understood that there will also be times when they are drawing less power. In the example of FIGS. 2-5, if all of the blades were subscribed simultaneously, 7X watts of power would have to be allocated to run the blades at maximum power. This is 3X watts above the nominal power of either of the power supplies 222 or 224 individually.

Figure 3:
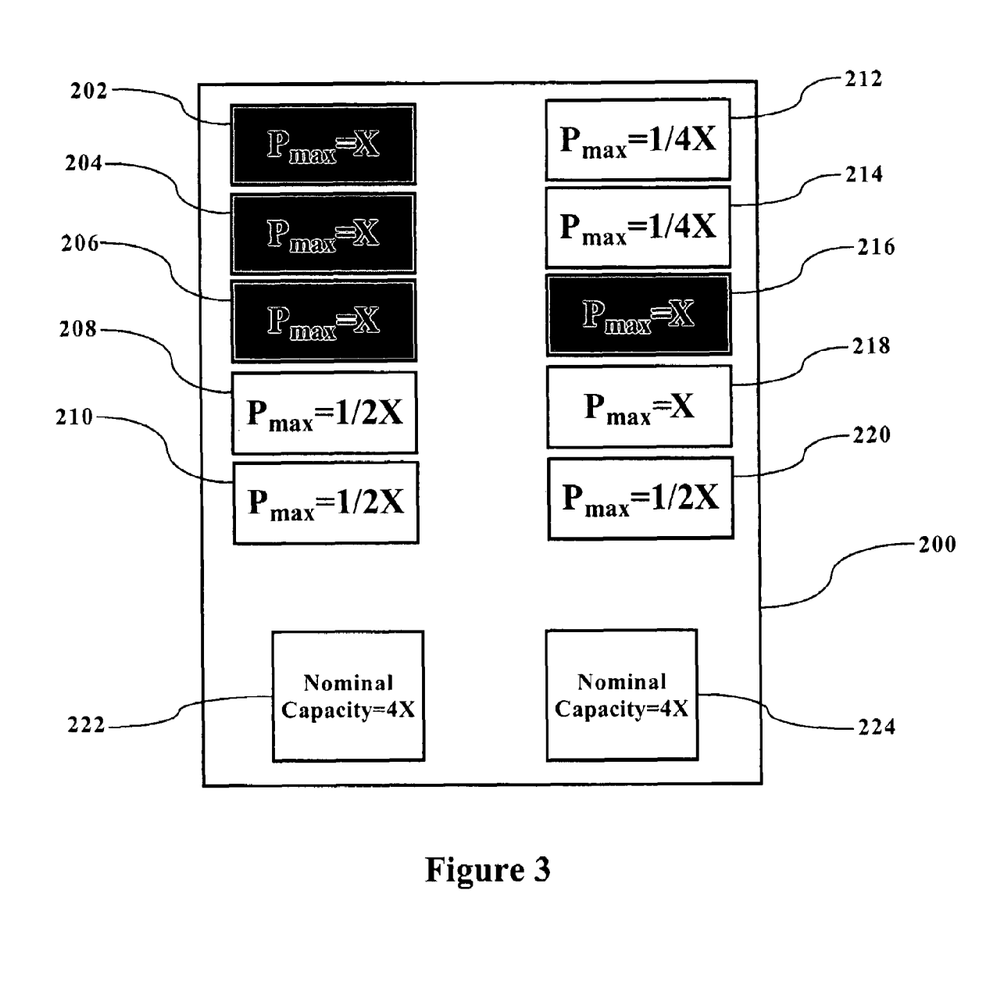

In FIG. 3, blades 202, 204, 206, and 216 are shaded, indicating that they have been accepted and are thus authorized to draw power from power supplies 222 and 224. Since each of the blades accepted in FIG. 3 are allocated 1X watts of power, the amount of power allocated from power supplies 222 and 224 total 4X watts. In this situation, the system is operating in a fully-redundant condition, with either power supply 222 or 224 able to handle the power needs of the system individually. If the system is to remain fully-redundant, any attempts to power-on additional blades will be rejected.

Figure 4:
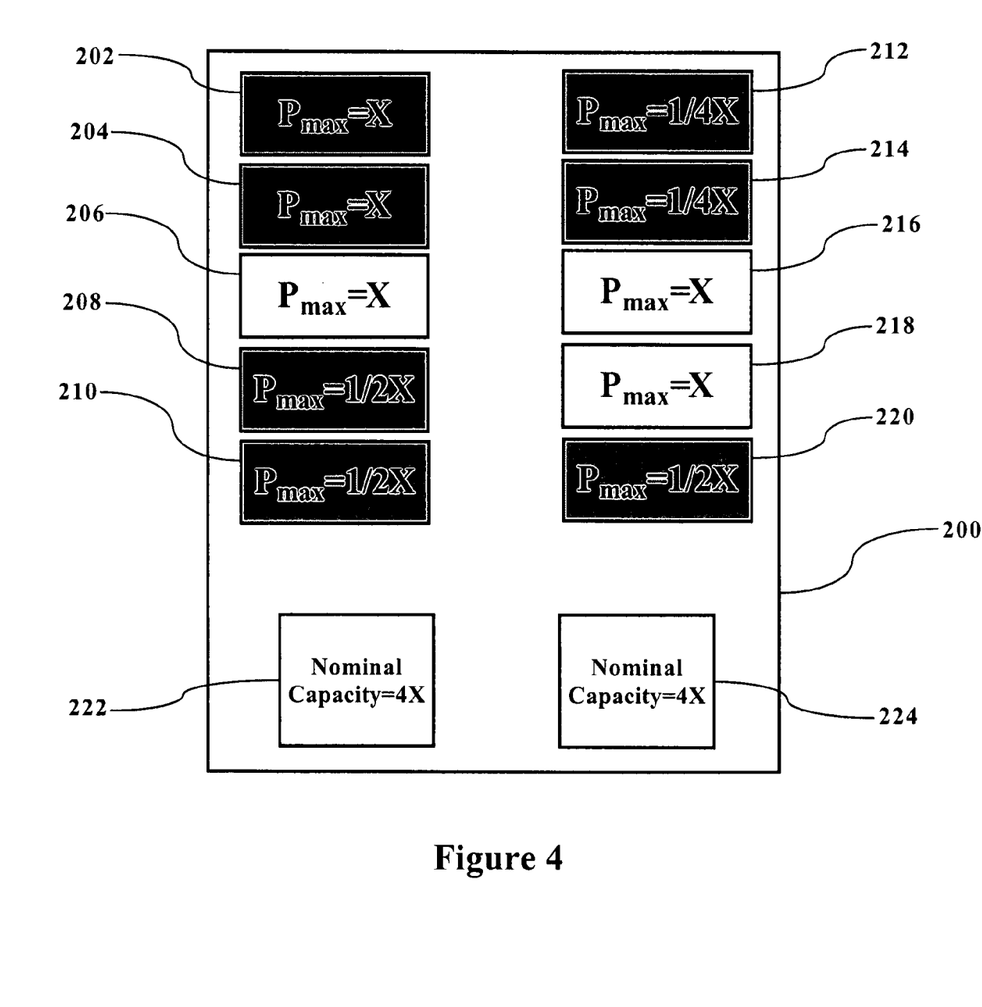

In FIG. 4, a different combination of accepted blades is shown (blades 202, 204, 208, 210, 212, 214, and 220). As compared to the subscription status illustrated in FIG. 3, there are three more blades accepted in FIG. 4; however, the combined maximum allocated power needed for the blades accepted in FIG. 4 is also 4X watts, the same amount allocated in FIG. 3. Like the example of FIG. 3, in FIG. 4, the system is operating in a fully-redundant condition, with either power supply 222 or 224 able to individually handle the power needs of the system. If the system is to remain fully-redundant, any attempts to power-on additional blades will be rejected.

Figure 5:
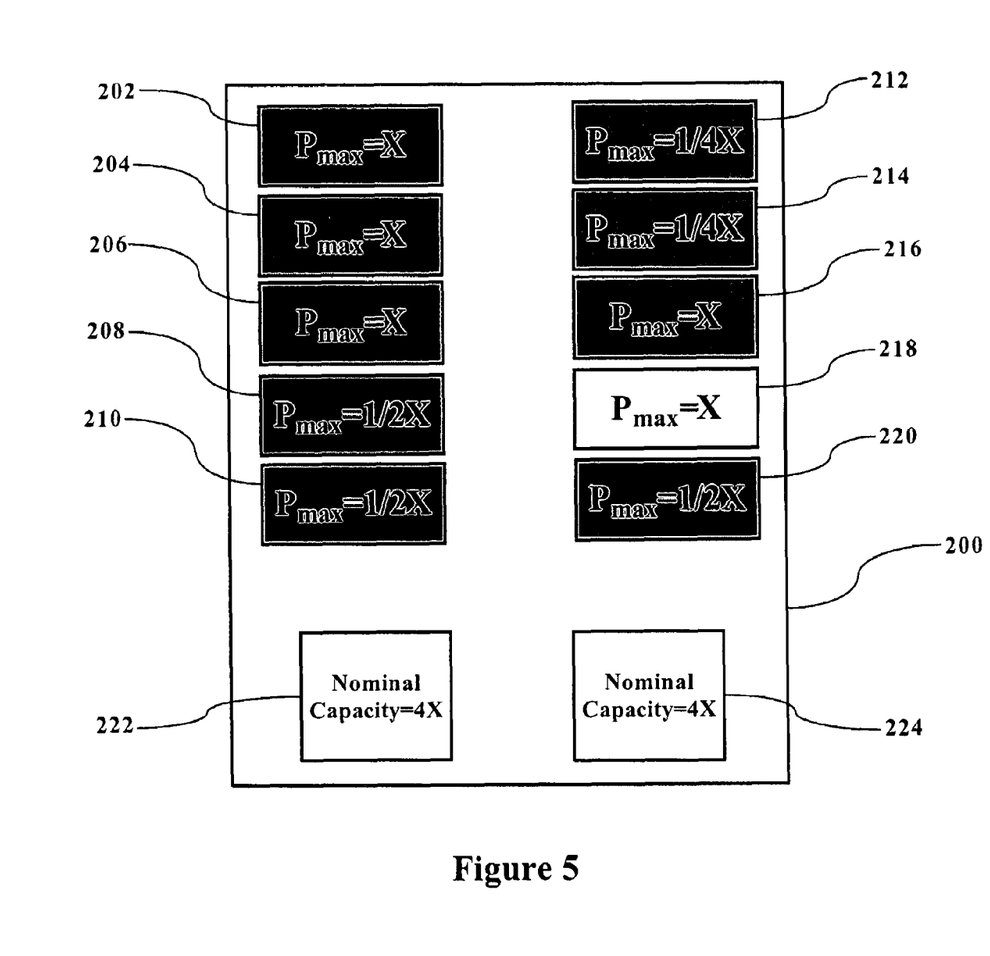

FIG. 5 illustrates an over-subscription situation. In FIG. 5, blades 202-216 and 220 are accepted, and the combined maximum allocated power needed for these blades is 6X watts, which exceeds the nominal power of the power supplies 222 and 224 individually. In this situation, the system is not fully redundant; if one of the power supplies fails, the other will not be able to continue to supply the accepted blades operating at their maximum power level.

Figure 6:
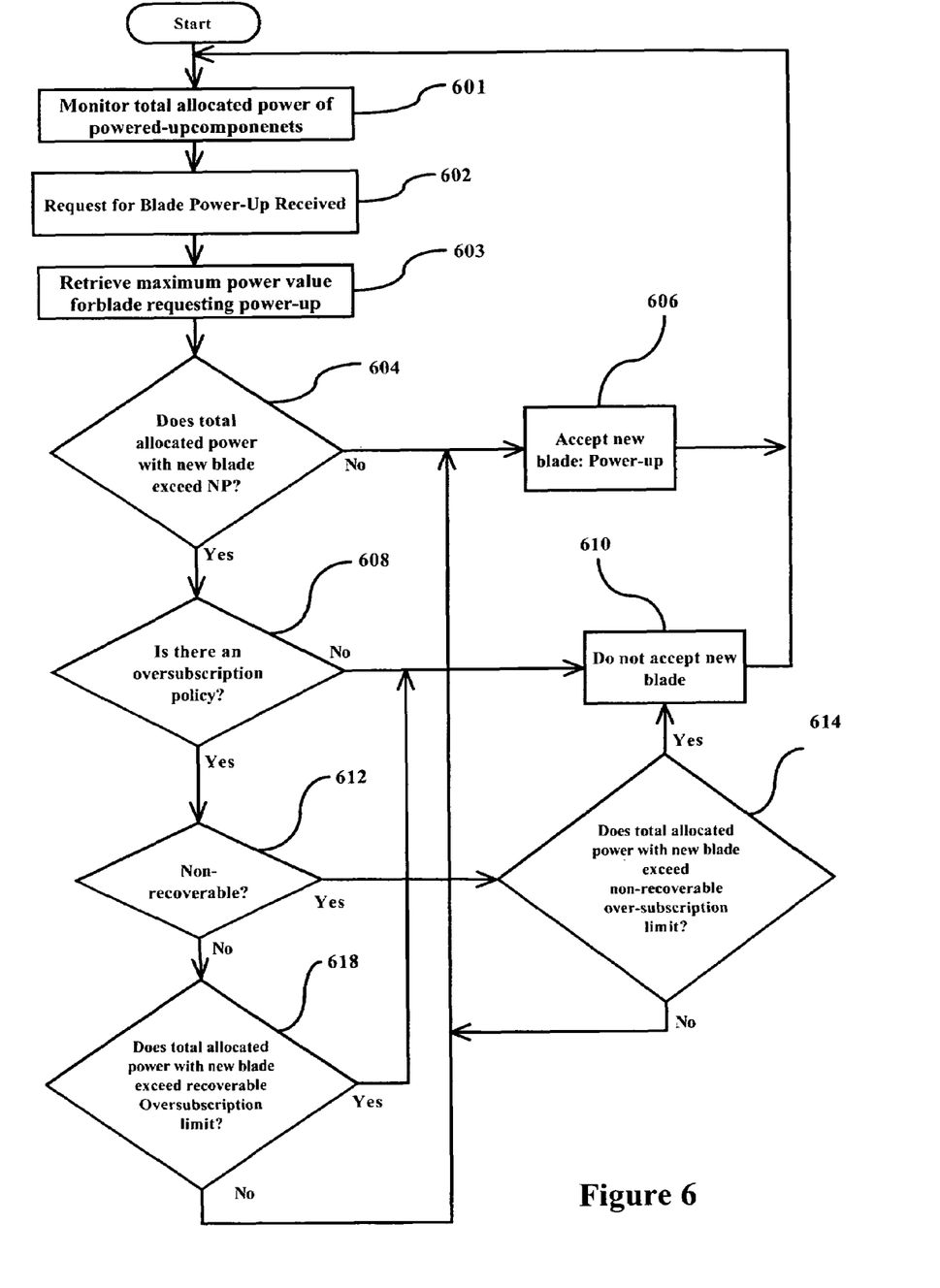
FIG. 6 is a flowchart illustrating the basic steps performed in accordance with the present invention.

With the above background understanding of redundancy and over-subscription, the present invention is now described with reference to FIG. 6. FIG. 6 is a flowchart illustrating the basic steps performed in accordance with the present invention. These steps can be performed by the management module processor coupled to the management module of the blade system when it is configured to perform the steps described.

At step 601, the total allocated power of the presently-accepted blades is monitored so that at any given time the system has an awareness of the power required to run the blades that are already accepted and powered-up. At step 602, a request to power-up an unpowered blade is received. At step 603, the maximum power value required for the blade requesting power-up is retrieved. This information can be obtained, for example, from the BIOS of each blade, which stores a representation of the power demand for each option included for that blade. As set forth below, in a preferred embodiment the system is configured so that this BIOS information can be obtained by a partial power-up of the blade. Additional details regarding the calculation of the maximum power required by a blade is given below At step 604, a determination is made as to whether or not the total allocated power, with the new blade accepted, will exceed the nominal power of the non-redundant power supply. If it is determined that, with the new blade accepted, the total allocated power will not exceed the nominal power of the non-redundant power supply, then the process proceeds to step 606, where the new blade is accepted and powered, and then the process proceeds back to step 601 where the system continues to be monitored for power-on requests. If, however, at step 604 it is determined that accepting the new blade will exceed the nominal power of the non-redundant power supply, then the process proceeds to step 608.

At step 608, a determination is made as to whether or not there is an over-subscription policy in place. The over-subscription policy is set by a system administrator, and information (data) regarding specifics of the policy is stored, for example, in the management module. If no over-subscription policy is in place, then the process proceeds to step 610, where the power-on request for the new blade is denied. If, however, at step 608 it is determined that an over-subscription policy is in place, then the process proceeds to step 612, where a determination is made as to whether or not the policy is a non-recoverable over-subscription policy.

If the policy is a non-recoverable policy, then the process proceeds to step 614, where it is determined if the addition of the new blade will result in an allocation of power that exceeds the non-recoverable over-subscription limit. If it does, then at step 610 the new blade is denied power. If it does not, then at step 606 the new blade is accepted and powered.

If the policy is a recoverable over-subscription policy, then at step 618, a determination is made as to whether or not the addition of the new blade will result in an allocation of power that will exceed the recoverable over-subscription limit. If it does, then at step 610 the new blade is denied power; if it does not, than at step 606 the new blade is accepted and powered.

The blades calculate their maximum power requirement based on the options installed on the blade. In some cases installed options can only be identified once power is applied to the blade. These blades must indicate their BIOS maximum power to the management module (via VPD or other exchange method). This value represents the maximum power required to get the blade in a minimal operational state where the options can be identified. In this state the blade would not have booted to its full operational state. Thus the process is:

1. Management module retrieves the BIOS (pre-boot) maximum power required;
2. If this (pre-boot) amount of power is acceptable, then the management module requests the blade to perform its calculation for maximum power;
3. If this (pre-boot) value is not acceptable then the blade is not accepted and is powered off;
4. The blade will power up, but BIOS suspends prior to OS boot;
5. The blade retrieves the information for the options installed;
6. The blade calculates the maximum power value based on the installed options;
7. The blade notifies the management module of the maximum power value;
8. The management module proceeds (as in step 604 of FIG. 6);
9. When the blade is accepted (step 606 in FIG. 6), the management module releases the blade to continue with boot.

Figure 7:
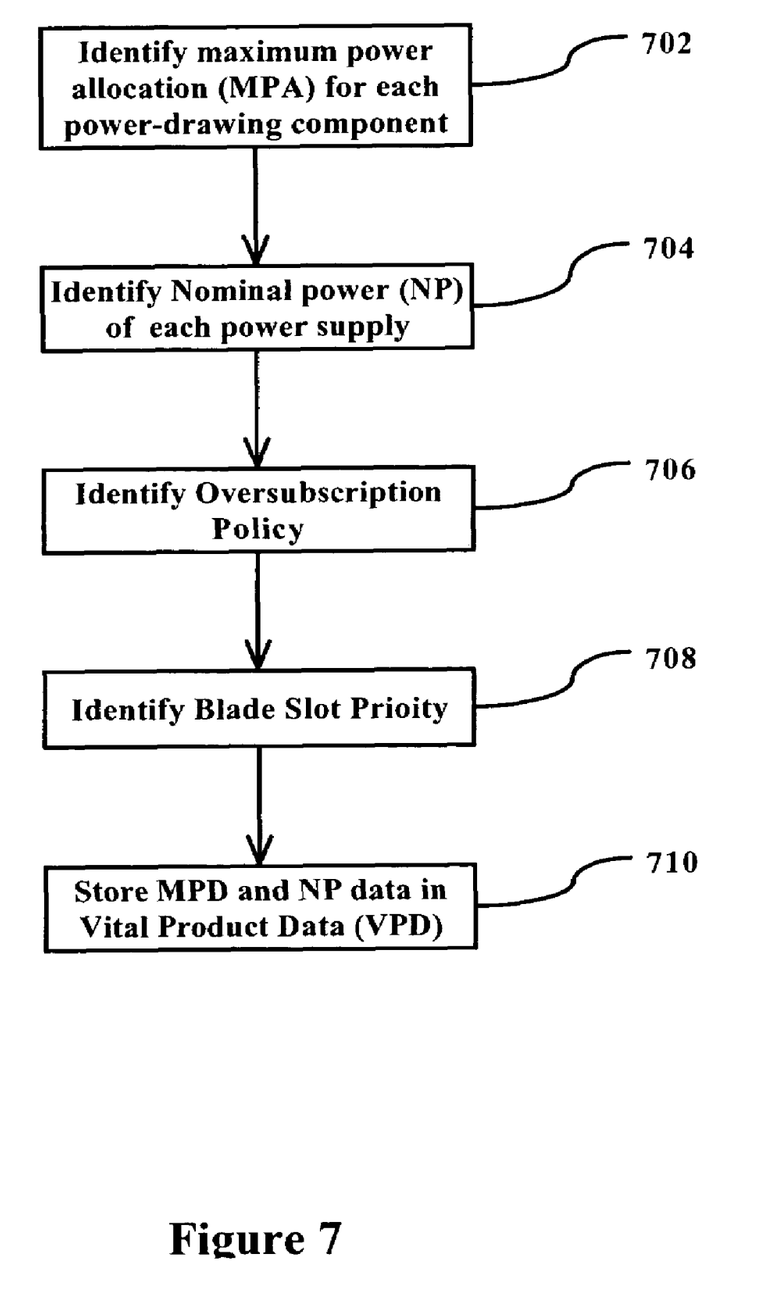
FIG. 7 is a flowchart illustrating initialization steps performed to enable the present invention.

FIG. 7 is a flowchart illustrating initialization steps performed to enable the present invention. These steps set the system up to be able to identify power allocation needs of the blades, power allocation deliverable by the power supplies, over-subscription policies (if any) of the system, and priorities for scaling back power allocation when a situation arises that requires throttling.

Referring to FIG. 7, at step 702, the maximum power allocation (MPA) required to fully power each blade or other power-drawing component is identified. Each blade has certain components (e.g., additional process options, disk options, memory options, network daughter cards, etc.) and may also be configured with certain power-drawing options. The maximum power consumed by each blade, taking into account all options included with the blade, can be determined from power specifications for these components. As indicated above, if desired this information can be put in the BIOS of the blade and made available upon a partial power-up of the blade, so that the full power-draw of the blade does not tax the power supplies unless the power is available.

At step 704, the nominal power (NP) allocatable by each power supply supplying power to the chassis is identified. This is a specification available for the power supply and is thus readily available and may be stored in the power supply VPD.

At step 706, the over-subscription policy (none, non-recoverable, or recoverable) is identified. This will vary from system user to system user. One user may be willing to risk non-recoverable over-subscription in an effort to reduce costs, another may allow over-subscription, but only if recoverable, and a third may require full redundancy with no over-subscription allowed. Information regarding the desired over-subscription policy is input by a system operator or other system administration person and is stored, e.g., in the management module. In accordance with the present invention, the particular policy in place for a particular chassis is identified. At step 708, if recoverable over-subscription has been selected, then "blade slot priority" can also be identified, to identify the order in which blades will be affected (shut down completely, changed to a reduced power mode, etc) in the event of a loss of redundant power.

At step 710, the information identified in steps 702-708 is stored for use. For example, the MPA and NP information can be stored in the Vital Product Data (VPA) of the blades and power supplies, respectively. Similarly, the over-subscription policy as defined by the administrator for the chassis or chassis power domain can be persisted by the management module. The blade slot priority is also defined by the administrator and saved by the management module. All of this information may be used when performing the steps of FIG. 6.

Using the present invention, over-subscription of power can be managed automatically, with little or no need for user intervention at the time that the over-subscription situation is occurring. Notifications (e.g., email, network notices, etc.) can be sent out when an event occurs so that troubleshooters can be dispatched, if needed.

Although the descriptions herein refer to the use of the present invention with blade computers (server blades, desktop blades, etc.), the present invention as claimed is not so limited. The present invention may be used with other components, including "blade-like" devices that are not generally considered servers in the IT sense, drop-insert routing of telecom circuits, voice processing blades, blades that packetize voice from telecom circuits to a packet network, as well as switch modules, integrated switches and the like.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage on a disk drive located in a rack housing. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, this disclosure supports combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for power management in a blade computing system having one or more power supplies and a plurality of components capable of being powered up by said one or more power supplies, comprising:

continuously monitoring power allocated for all fully-powered-up components;

retrieving a maximum power value for a first component requesting full power-up, wherein the maximum power value for said first component is stored in BIOS of said first component;

performing a partial power-up of said first component to execute the BIOS, thereby enabling the options present on said first component to be identified without performing a full power-up of said first component;

identifying any over-subscription policies for said blade computing system;

determining if the maximum power value for said first component falls within or outside of an over-subscription policy;

accepting and fully powering-up said first component if the maximum power value for said first component falls within an over-subscription policy;

rejecting and not fully powering-up said first component if the maximum power value for said first component falls outside of said over-subscription policy;

sensing a loss of function in at least one of said power supplies; and upon sensing of a loss of function of at least one of said power supplies, performing a power-reduction procedure whereby one or more of said components are throttled to reduce the aggregate of power consumed by said plurality of components, whereby said throttling is performed according to a predetermined throttling schedule, and wherein said predetermined throttling schedule first throttles components drawing the highest amounts of power.

2. The method of claim 1, wherein said first component comprises a blade, and wherein said maximum power value for said blade is calculated based on options present on said blade.

3. The method of claim 1, wherein said over-subscription policy is set by an administrator of said blade computing system.

4. The method of claim 3, wherein said blade computing system includes a management module, wherein said step of determining if the maximum power value for said first component falls within or outside of an over-subscription policy comprises:

obtaining a power subscription capacity for each of said one or more power supplies;

using said management module, comparing the power subscription capacity for each of said one or more power supplies with the combined maximum power value for said first component and the power allocated for all powered up components to obtain a power-available-vs.-power-needed result; and comparing the power-available-vs-power-needed result with said over-subscription policy to identify if it is within or outside of said over-subscription policy.

5. A system for power management in a blade computing system having one or more power supplies and a plurality of components capable of being powered up by said one or more power supplies, comprising:

a power monitor for continuously monitoring power allocated for all fully-powered-up components;

means for retrieving a maximum power value for a first component requesting full power-up, wherein the maximum power value for said first component is stored in BIOS of said first component;

means for performing a partial power-up of said first component to execute the BIOS, thereby enabling the options present on said first component to be identified without performing a full power-up of said first component;

means for identifying any over-subscription policies for said blade computing system;

means for determining if the maximum power value for said first component falls within or outside of an over-subscription policy;

means for accepting and fully powering-up said first component if the maximum power value for said first component falls within an over-subscription policy;

means for rejecting and not fully powering-up said first component if the maximum power value for said first component falls outside of said over-subscription policy;

means for sensing a loss of function in at least one of said power supplies; and means for performing a power-reduction procedure whereby one or more of said components are throttled to reduce the aggregate of power consumed by said plurality of components upon sensing of a loss of function of at least one of said power supplies, whereby said throttling is performed according to a predetermined throttling schedule, and wherein said predetermined throttling schedule first throttles components drawing the highest amounts of power.

6. The system of claim 5, wherein said first component comprises a blade, and wherein said maximum power value for said blade is calculated based on options present on said blade.

7. The system of claim 5, wherein said over-subscription policy is set by an administrator of said blade computing system.

8. The system of claim 7, wherein said blade computing system includes a management module, wherein said means for determining if the maximum power value for said first component fails within or outside of an over-subscription policy comprises:

means for obtaining a power subscription capacity for each of said one or more power supplies;

means for using said management module, comparing the power subscription capacity for each of said one or more power supplies with the combined maximum power value for said first component and the power allocated for all powered up components to obtain a power-available-vs.-power-needed result; and means for comparing the power-available-vs-power-needed result with said over-subscription policy to identify if it is within or outside of said over-subscription policy.

* * * * *